(12) United States Patent
Bowers et al.

(10) Patent No.: US 9,150,156 B2
(45) Date of Patent: Oct. 6, 2015

(54) VEHICLE MIRROR ASSEMBLY

(75) Inventors: Kenneth Bowers, Romeo, MI (US);
Alfredo Dimichele, Macomb Township, MI (US); Kathryn Templeton, Bloomfield Hills, MI (US); Kurt Maxwell, New Hudson, MI (US)

(73) Assignee: Nissan North America, Inc., Franklin, TN (US)

( * ) Notice: Subject to any disclaimer, the term of this patent is extended or adjusted under 35 U.S.C. 154(b) by 509 days.

(21) Appl. No.: 13/599,965

(22) Filed: Aug. 30, 2012

(65) Prior Publication Data

US 2014/0063245 A1    Mar. 6, 2014

(51) Int. Cl.
*B60R 1/06* (2006.01)
*B60R 1/12* (2006.01)

(52) U.S. Cl.
CPC ....... *B60R 1/0607* (2013.01); *B60R 2001/1253* (2013.01)

(58) Field of Classification Search
CPC .... B60R 1/06; B60R 1/10; B60R 2001/1215; B60R 2001/1253
See application file for complete search history.

(56) References Cited

U.S. PATENT DOCUMENTS

| | | |
|---|---|---|
| 4,583,155 A | 4/1986 | Hart |
| 7,270,430 B2 | 9/2007 | Olijnyk et al. |
| 7,287,867 B2 | 10/2007 | Wellington et al. |
| 7,445,392 B2 | 11/2008 | Straehle et al. |
| 7,517,099 B2 | 4/2009 | Hannah |
| 7,540,619 B2 | 6/2009 | Henion |
| 7,825,951 B2 | 11/2010 | Lang et al. |
| 8,182,125 B2 | 5/2012 | Englander et al. |
| 8,243,994 B2 | 8/2012 | Suzuki et al. |
| 2004/0121820 A1 | 6/2004 | Unno et al. |
| 2010/0238051 A1 | 9/2010 | Suzuki et al. |
| 2012/0069182 A1 | 3/2012 | Sumi et al. |
| 2014/0063233 A1 | 3/2014 | Henion et al. |

FOREIGN PATENT DOCUMENTS

| | | |
|---|---|---|
| EP | 0945305 A1 | 9/1999 |
| JP | 2008-049783 A | 3/2008 |
| JP | 2010-012865 A | 1/2010 |
| WO | WO-2008/068573 A2 | 6/2008 |

*Primary Examiner* — Twyler Haskins
*Assistant Examiner* — Angel L Garces-Rivera
(74) *Attorney, Agent, or Firm* — Global IP Counselors, LLP

(57) ABSTRACT

A vehicle mirror assembly includes a vehicle attachment member, a mirror housing, a mirror and a camera. The vehicle attachment member is configured for attachment to a vehicle. The mirror housing is telescopically coupled to the vehicle attachment member between a retracted position and an extended position relative to the vehicle attachment member. The mirror housing defines a camera receiving recess. The mirror is coupled to the mirror housing. The camera is coupled to the vehicle attachment member and disposed in the camera receiving recess of the mirror housing at a fixed position relative to the vehicle attachment member while the mirror housing is moved between the extended position and the retracted position.

20 Claims, 11 Drawing Sheets

VEHICLE MIRROR ASSEMBLY

BACKGROUND

1. Field of the Invention

The present invention generally relates to a vehicle mirror assembly. More specifically, the present invention relates to a vehicle mirror assembly that includes a vehicle attachment member, a mirror housing and a camera within the mirror housing but being fixed in position relative to the vehicle attachment member, and the mirror housing is configured to undergo telescopic movement relative to the vehicle attachment member.

2. Background Information

All vehicles typically include at least one mirror assembly that is mounted to a door of the vehicle. The mirror assembly is positioned such that a vehicle operator can look in the mirror and see areas at the side of the vehicle behind the vehicle operator and observe areas behind the vehicle. Recently, the mirror assembly has been modified to include features like telescopic movement and pivoting movement (aka folding movement). The telescopic movement includes the mirror housing being moveable between a retracted position and an extended position, where in the extended position, the mirror itself is positioned laterally further away from the side of the vehicle than in the retracted position. The telescopic movement is advantageous when the vehicle is pulling, for example, a trailer. The lateral telescopic movement away from the vehicle provides the vehicle operator with an increased field of view through the mirror of the mirror assembly. The pivoting movement of the mirror assembly allows the mirror assembly to be moved to a folded position where the mirror is pivoted to face the vehicle door. In the folded position, the mirror assembly does not extend much beyond the side of the vehicle, making it easier to move around the side of the vehicle when parked in cramped spaces.

SUMMARY

One object is to provide a mirror assembly with a camera disposed within a mirror housing, where the mirror housing can undergo telescopic movement relative to a side of the vehicle, but the camera remains in a fixed position relative to the side of the vehicle.

In view of the state of the known technology, one aspect of the present disclosure is to provide a vehicle mirror assembly that includes a vehicle attachment member, a mirror housing, a mirror and a camera. The vehicle attachment member is configured for attachment to a vehicle. The mirror housing is telescopically coupled to the vehicle attachment member between a retracted position and an extended position relative to the vehicle attachment member. The mirror housing defines a camera receiving recess. The mirror is coupled to the mirror housing. The camera is coupled to the vehicle attachment member and disposed in the camera receiving recess of the mirror housing at a fixed position relative to the vehicle attachment member while the mirror housing is moved between the extended position and the retracted position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
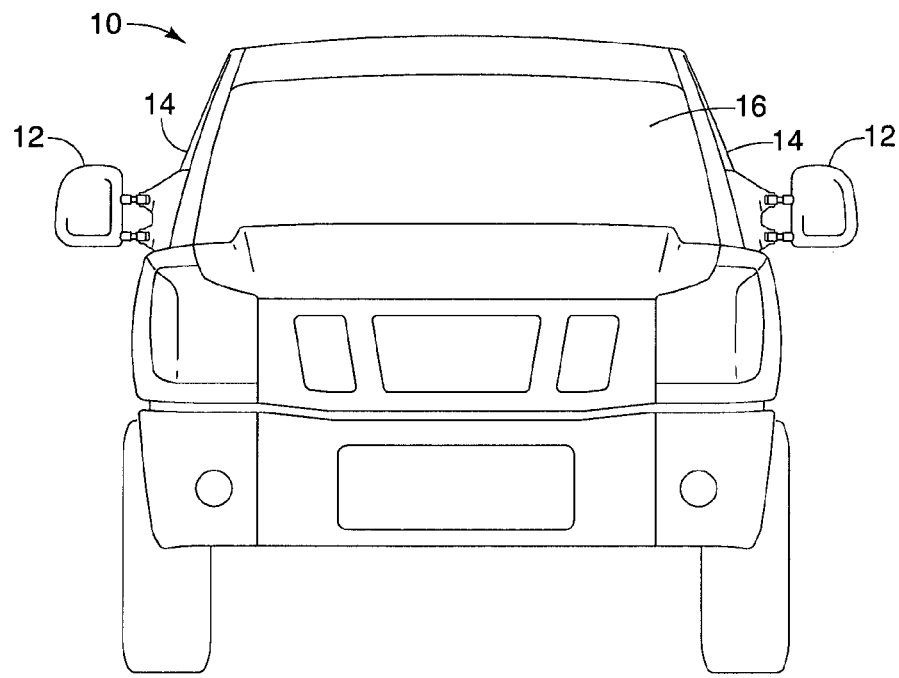
FIG. 1 is a front view of a vehicle that includes a mirror assembly in accordance with various embodiments.

Referring initially to FIG. 1, a vehicle 10 having a mirror assembly 12 is illustrated in accordance with a first embodiment. The vehicle 10 is depicted as a truck or SUV but can be any vehicle design that includes side view mirrors, such as the mirror assembly 12, described in greater detail below.

Figure 2:
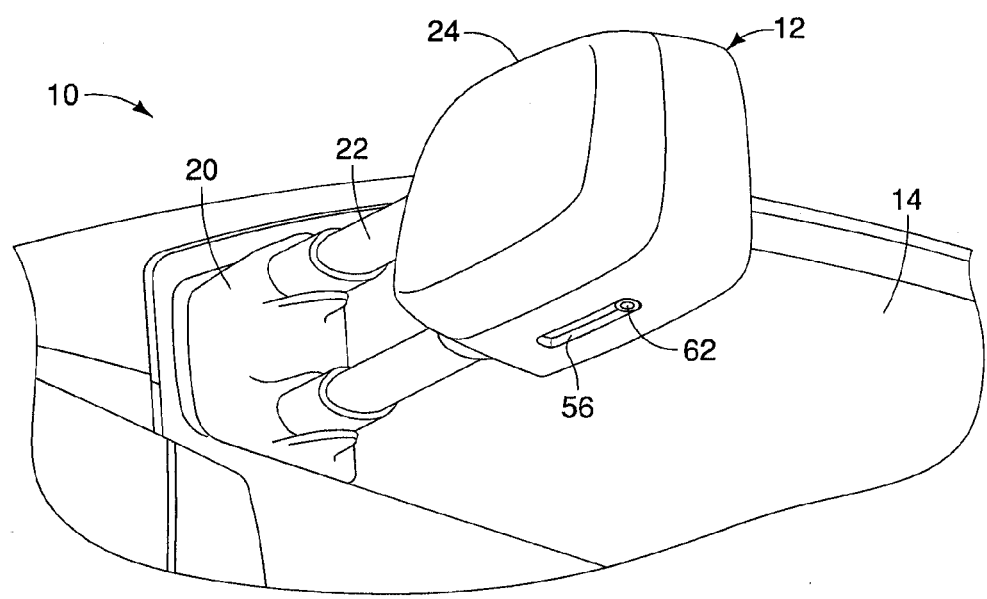
FIG. 2 is a perspective view of a portion of the vehicle, showing a door of the vehicle with the mirror assembly attached thereto, the mirror assembly having mirror housing that defines a camera receiving recess and a window, with a camera disposed within the camera receiving recess and a lens of the camera capturing images through the window of the mirror housing of an area adjacent to the vehicle in accordance with a first embodiment.

The vehicle 10 includes a variety of features, such as side doors 14 (only one side door is depicted in FIG. 2) and a passenger compartment 16. The vehicle 10 includes many other features. However, description of these other features is not necessary to understand the present invention. Therefore, further description of these features is omitted for the sake of brevity.

The vehicle 10 also includes a video system that includes a plurality of cameras and a display on an instrument panel within the passenger compartment 16 of the vehicle 10. Each of the plurality of cameras is trained on a different area around the outer periphery of the vehicle 10. An image processor takes the images captured by each of the plurality of cameras and streams these captured images to the display in the instrument panel of the vehicle 10. An operator or driver of the vehicle 10 can observe the areas around the vehicle 10 captured by the plurality of cameras by watching the display. The video system provides the driver with an added level of perception while performing certain operations, such as backing up and parking. The video system can include a feature in which the images captured by the plurality of cameras are superimposed over a still image of the vehicle to orient the viewer. When such a feature is employed, it is important that each of the plurality of cameras is in a fixed position relative to the vehicle 10 for accurate processing of the captured images. It should be understood that the mirror assembly 12 described hereinbelow can be used with such a video system. Therefore the location of each of the plurality of cameras should remain fixed relative to the vehicle 1010 unless the mirror housing 24 is in a folded position, as described in greater detail below. Such video systems are known and therefore, further description is omitted for the sake of brevity.

More detailed descriptions of various video systems can be found in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety.

The mirror assembly 12 includes a camera 30, which is one of the plurality of cameras of the video system of the vehicle 10. There are two mirror assemblies 12 depicted in FIG. 1. The two mirror assemblies 12 are basically identical except that they are symmetrical to one another (mirror images of one another). Therefore description of one mirror assembly 12 applies to both.

As shown in FIG. 2, the mirror assembly 12 is fixedly attached to the side door 14 of the vehicle 10. The attachment between the mirror assembly 12 and the side door 14 is conventional and therefore description is omitted for the sake of brevity. However, it should be understood from the drawings and the description herein that the mirror assembly 12 can be attached to the side door 14 by any of a variety of means, such as threaded fasteners, snap-fitting projections, rivets, or other mechanical fastening arrangements.

Figure 3:
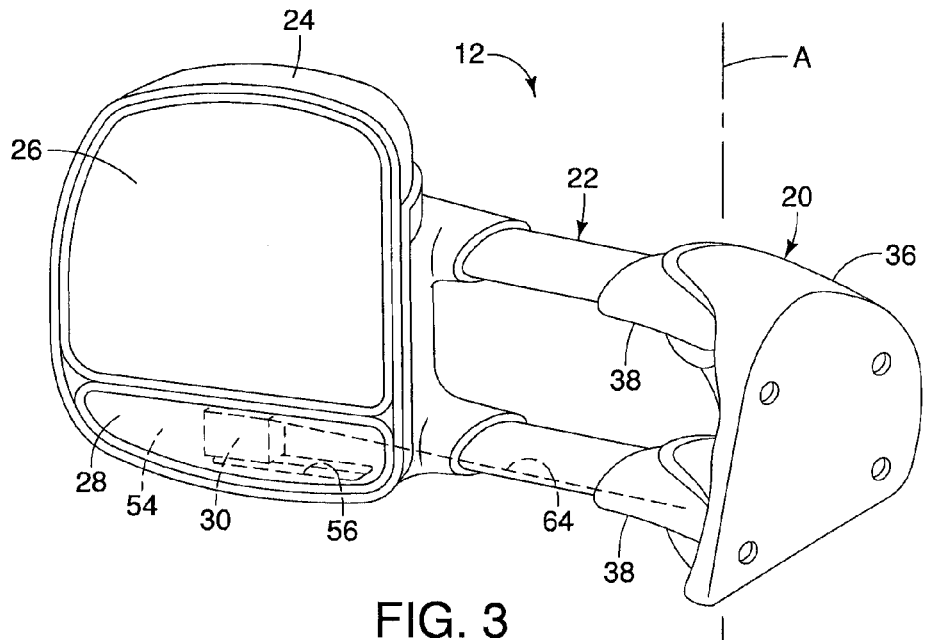
FIG. 3 is a perspective view of the mirror assembly shown removed from the vehicle, the mirror assembly having an attachment member, a telescoping portion and the mirror housing, the mirror housing being shown in a retracted position relative to the attachment member and showing the camera in a first position relative to the camera receiving recess, the camera being fixed in position relative to the attachment member in accordance with the first embodiment.
Figure 4:
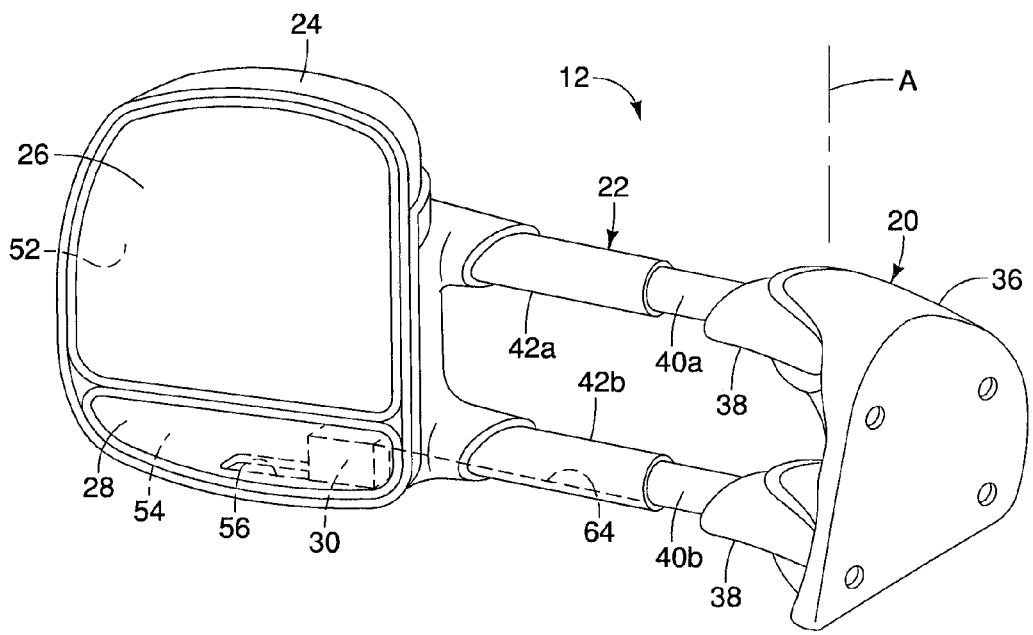
FIG. 4 is another perspective view of the mirror assembly similar to FIG. 3, the mirror housing shown in an extended position relative to the attachment member and showing the camera in a second position relative to the camera receiving recess, the camera being fixed in position relative to the attachment member in accordance with the first embodiment.
Figure 5:
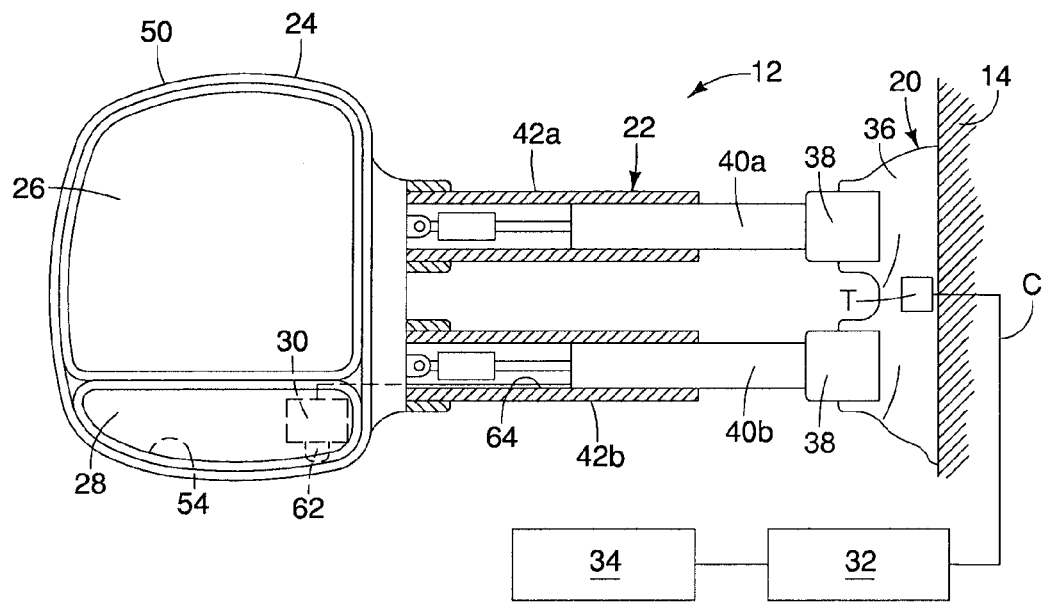
FIG. 5 is a schematic view of the mirror assembly, with features of the telescoping portion of the mirror assembly cutaway to show a tether that fixes the position of the camera relative to the attachment member in accordance with the first embodiment.

The mirror assembly 12, in accordance with of a first embodiment is now described with specific reference to FIGS. 3-9. The mirror assembly 12 basically includes a vehicle attachment member 20 (or mirror base), a telescoping portion 22, a mirror housing 24, an adjustable mirror 26, a convex mirror 28, a camera 30, a controller 32 (FIG. 5 only) and a control panel 34 (FIG. 5 only).

The vehicle attachment member 20 basically includes a bracket portion 36 and supporting projections 38. The bracket portion 36 is configured for attachment to the side door 14 of the vehicle 10. However, it should be understood from the drawings and the description herein that the bracket portion 36 of the vehicle attachment member 20 can also attach to a fender or an A-pillar of the vehicle 10, as long as the mirror assembly 12 is positioned to provide a rearward side view of the areas behind the vehicle operator while the vehicle operator is seated in the driver's seat and/or the passenger's seat of the vehicle 10. As is mentioned above, the bracket portion 36 of the vehicle attachment member 20 attaches to the vehicle 10 in any of a variety of conventional attachment configurations. Since such attachment configurations are conventional, further description is omitted for the sake of brevity.

The pair of supporting projections 38 can be rigidly fixed to and/or formed with the bracket portion 36 of the vehicle attachment member 20, or alternatively can be pivotally supported by the bracket portion 36 of the vehicle attachment member 20 about an axis A (FIG. 3). Specifically, the mirror housing 24, the telescoping portion 22 and the supporting projections 38 can pivot about the axis A such that the mirror housing 24 is moved between an in-use position and a folded position. In the in-use position (shown in the drawings), the mirror housing 24 is positioned such that the vehicle operator (or passenger) can look at the adjustable mirror 26 and observe objects rearward. In the folded position (not shown), the mirror housing 24 is pivoted about the axis A such that the adjustable mirror 26 faces and is adjacent to the side door 14 of the vehicle 10. Since the folded position is a conventional feature, further description is omitted for the sake of brevity.

The telescoping portion 22 is defined by tube sections 40a, 40b, 42a and 42b. As shown in FIGS. 4 and 5, the tube sections 40a and 40b are rigidly attached to (or formed with) the supporting projections 38 of the vehicle attachment member 20. The tube sections 40a and 40b are hollow such that mirror control cables C can extend from the mirror housing 24 to the interior of the side door 14 such that controller 32 and the control panel 34 provided within the vehicle 10 can control telescoping positioning of the mirror housing 24 and/or control the positional adjustments of the adjustable mirror 26 in a conventional manner.

The tube sections 42a and 42b are also hollow tubes that are rigidly fixed to (or formed with) the mirror housing 24. The tube sections 42a and 42b have inner diameters that are approximately the same (within engineering tolerances) as the outer diameters of the tube sections 40a and 40b. Consequently, the tube sections 42a and 42b are slidably disposed on the tube sections 40a and 40b, respectively. More specifically, the tube sections 42a and 42b can undergo telescopic movement relative to the tube sections 40a and 40b. A telescoping mechanism T is shown schematically in FIG. 5. The telescoping mechanism T can operate with respect to one or both of the tube sections 40a and 40b. The telescoping mechanism T can include hydraulic or pneumatic mechanisms, step motor mechanisms, rack and pinion type mechanisms, belt driven mechanisms, etc., that are operated via operator commands inputted via the control panel 34 and carried out by the controller 32 in a conventional manner. It should be understood that in the alternative tube sections 42a and 42b can be fixed to the vehicle attachment member 20 and tube sections 40a and 40b can be fixed to the minor housing 24 in order to support telescopic movement of the mirror housing 24 relative to the vehicle attachment member.

Examples of telescoping mechanisms in mirror assemblies are described in, for example, U.S. Pat. No. 4,583,155 to Hart, U.S. Pat. No. 7,540,619 to Henion, U.S. Pat. No. 7,287,867 to Wellington et al., and U.S. Pat. No. 7,270,430 to Olijnyk et al. U.S. Pat. No. 4,583,155, U.S. Pat. No. 7,540,619, U.S. Pat. No. 7,287,867, and U.S. Pat. No. 7,270,430 are all incorporated herein by reference in their entirety. Since such telescoping mechanisms are conventional, further description is omitted for the sake of brevity.

The mirror housing 24 is telescopically coupled to the vehicle attachment member 20 for movement between a retracted position (FIGS. 3, 6 and 8) and an extended position (FIGS. 4, 5 and 9) relative to the vehicle attachment member 20. The mirror housing 24 basically includes a main housing 50 that is rigidly attached to the tube sections 42a and 42b, which are telescopically disposed on an outer surface of the tube sections 40a and 40b.

The main housing 50 is a generally cup shaped or a concavely shaped member that defines a mirror receiving recess 52 and a camera receiving recess 54. The hollow interior of the tube section 42a is open to the mirror receiving recess 52 and the hollow interior of the tube section 42b is open to the camera receiving recess 54. The camera receiving recess 54 is dimensioned to receive the camera 30 such that the camera 30 can move within the camera receiving recess 54, as is described in greater detail below. The main housing 50 also defines a window 56 that extends between a lower surface of the main housing 50 to the camera receiving recess 54, as indicated in FIGS. 2-4, 6 and 8-9. The window 56 is basically an elongated slot that extends approximately perpendicular to the outer surface of the side door 14 with the mirror housing 24 in the in-use position.

The adjustable mirror 26 and corresponding positioning mechanism (not shown) are disposed within the mirror receiving recess 52 of the mirror housing 24 such that the positioning mechanism is hidden behind the adjustable mirror 26. The positioning mechanism can be an electronically controlled mechanism connected to the controller 32 and control panel 34, or alternatively, the adjustable mirror 26 can include a manually adjusted positioning mechanism (not shown). Since the positioning mechanism of the adjustable mirror 26 is a conventional feature, further description is omitted for the sake of brevity.

The convex mirror 28 is fixedly attached to the mirror housing 24, covering the camera receiving recess 54. However, the convex mirror 28 can also be movably mounted to a bezel so that the convex mirror 28 can still be adjusted while covering the camera receiving recess 54. The camera 30 is slidably disposed within the camera receiving recess 54, hidden by the convex mirror 28. The convex mirror 28 is shaped to make reflections of objects visible in mirror, appear to be larger than they actually are. Thus the operator of the vehicle 10 can be made more aware of small objects whose reflection is observed in the convex mirror 28.

Figure 6:
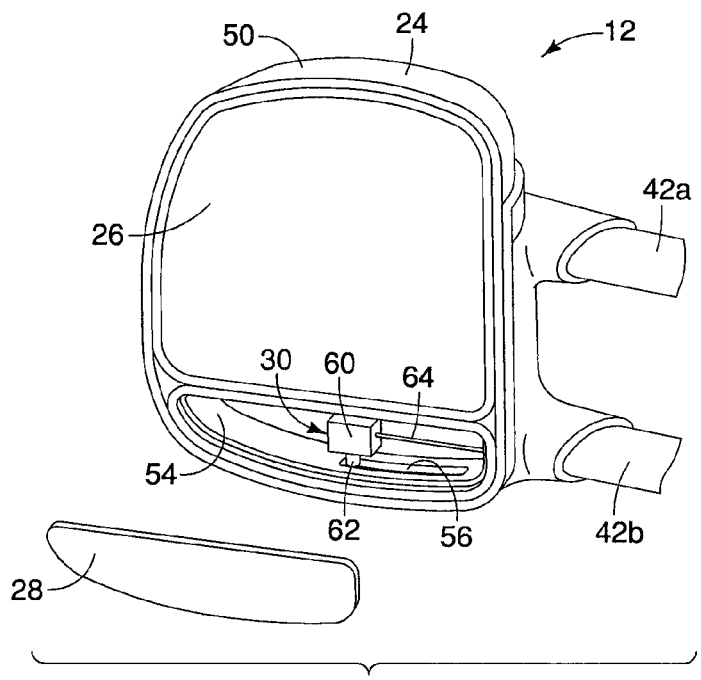
FIG. 6 is an exploded perspective view of a portion of the mirror assembly showing one of the mirrors of the mirror assembly removed revealing the camera receiving recess, the camera and a portion of the tether in accordance with the first embodiment.
Figure 7:
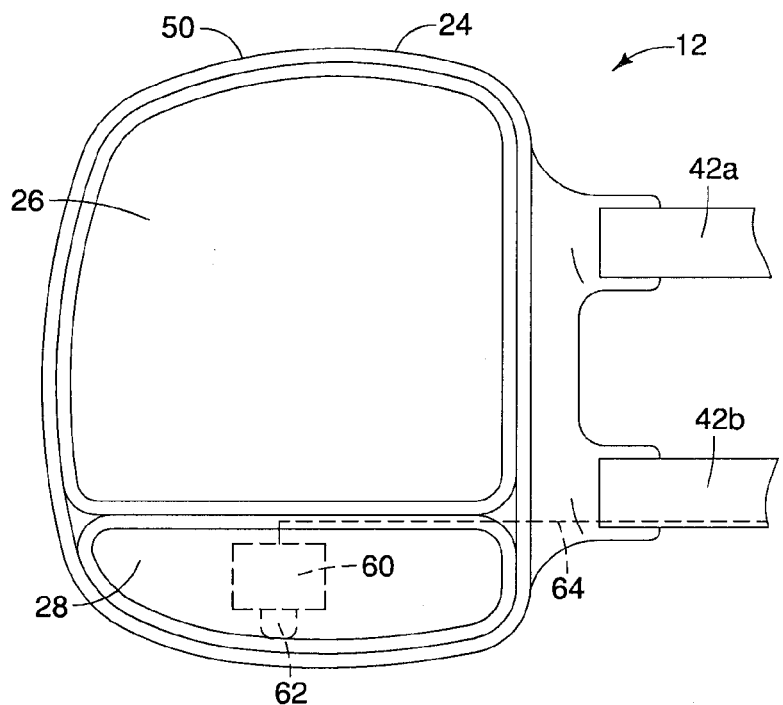
FIG. 7 is a rear view of a portion of the mirror assembly showing the mirror housing with the camera within the camera receiving recess in the first position in accordance with the first embodiment.

As mentioned above, the camera 30 is slidably disposed within the camera receiving recess 54. As shown in FIG. 6, the camera 30 basically includes a housing 60, a lens portion 62 and a tether 64. The housing 60 is depicted as having a rectangular shape, but can be formed in any of a variety of shapes that allow the camera 30 to move within the camera receiving recess 54 of the mirror housing 24. More specifically, the housing 60 can be provided with a specific shape or features that facilitate sliding movement within the camera receiving recess 54.

The lens portion 62 can be flush with an adjacent surface of the housing 60, but can also be a projection that extends at least partially into the window 56. Since the window 56 (as described above) is basically an elongated slot, the lens portion 62 can serve as a guide for the movement of the camera 30 along the length of the camera receiving recess 54. The lens portion 62 further includes a lens that captures images of objects through the window 56 of the mirror housing 24 while the mirror housing 24 is in both the extended position and the retracted position. More specifically, the lens portion 62 can extend into the window 56 while the mirror housing 24 is in both the extended position and the retracted position.

The window 56 can include a glass or transparent cover (not shown) that protects the lens portion 62 and prevents debris from entering the camera receiving recess 54. Alternatively, the camera 30 can be mounted such that a bottom of the lens portion 62 is flush with a bottom surface of the main housing 50.

Figure 8:
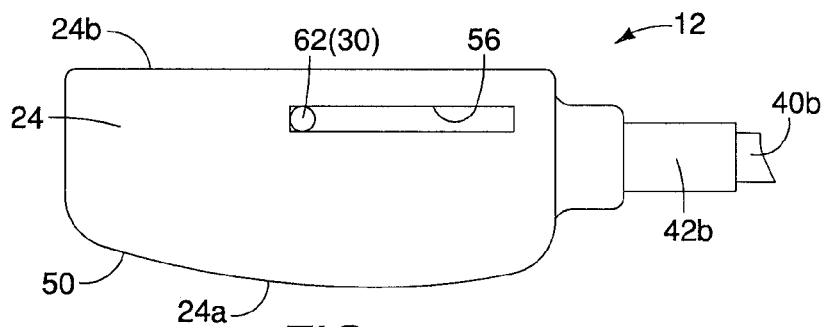
FIG. 8 is a bottom view of a portion of the mirror assembly depicted in FIG. 7, showing the mirror housing, the window with the lens extending at least partially into the window and the camera in the first position in accordance with the first embodiment.

The tether 64 can be any of a variety of structures. For example, in the depicted embodiment, the tether 64 is a rigid rod that is fixedly connected at one end to the tube section 40b (as shown in FIG. 5) and is fixedly connected at its opposite end to the housing 60 of the camera 30. Hence, the camera 30 is coupled to tube section 40b of the vehicle attachment member 20 by the tether 64. Alternatively, the tether 64 can be a cable within a rigid tube and the camera 30 can be shaped to telescopically slide within the camera receiving recess 54. The tether 64 provides a structure that causes the camera 30 to move relative to the mirror housing 24 when the mirror housing 24 is moved telescopically between the extended position and the retracted position. However, the tether 64 also retains the camera 30 in a fixed position relative to the vehicle attachment member 20 while the mirror housing is telescopically moved between the extended position and the retracted position. Hence, as shown in FIG. 8, with the mirror housing 24 in the retracted position, the lens portion 62 of the camera 30 is located at one end of the window 56. Further, as shown in FIG. 9, with the mirror housing 24 in the extended position, the lens portion 62 of the camera 30 is located at an opposite end of the window 56.

As shown in FIGS. 3 and 4, the convex mirror 28 at least partially covers the camera receiving recess 54 while the mirror housing 24 is in both the extended position (FIGS. 4, 5 and 9) and the retracted position (FIGS. 3, 6 and 8).

Figure 9:
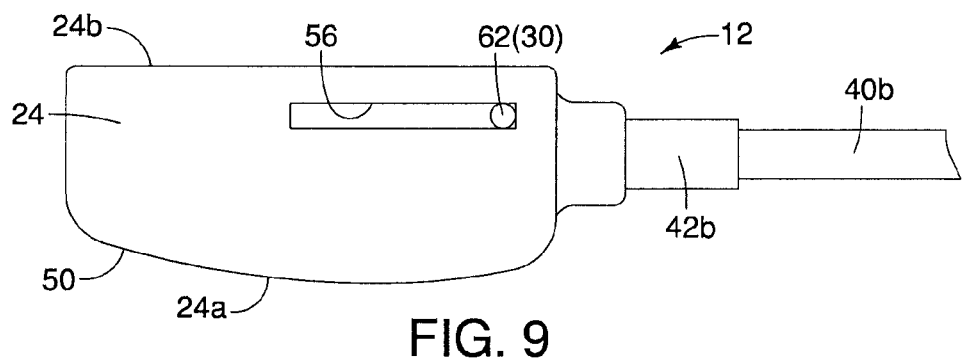
FIG. 9 is another bottom view of the portion of the mirror assembly depicted in FIG. 7, showing the mirror housing, the window with the lens extending at least partially into the window and the camera in the second position in accordance with the first embodiment.

As shown in FIGS. 8 and 9, the mirror housing 24 includes a lower wall defining the window 56. The lower wall of the mirror housing 24 includes front edge 24a and a rear edge 24b. The window 56 is located between the front and rear edges 24a and 24b. Further, the window 56 has an overall length greater that the lens portion 62 of the camera 30. The window 56 also extends in a direction that is parallel to a lengthwise direction of the tube sections 40a and 40b (hollow extensions) of the vehicle attachment member 20. The window 56 further extends in a direction that is parallel to a lengthwise direction of the tether 64 (an elongated connecting member) of the camera 30.

Second Embodiment

Figure 10:
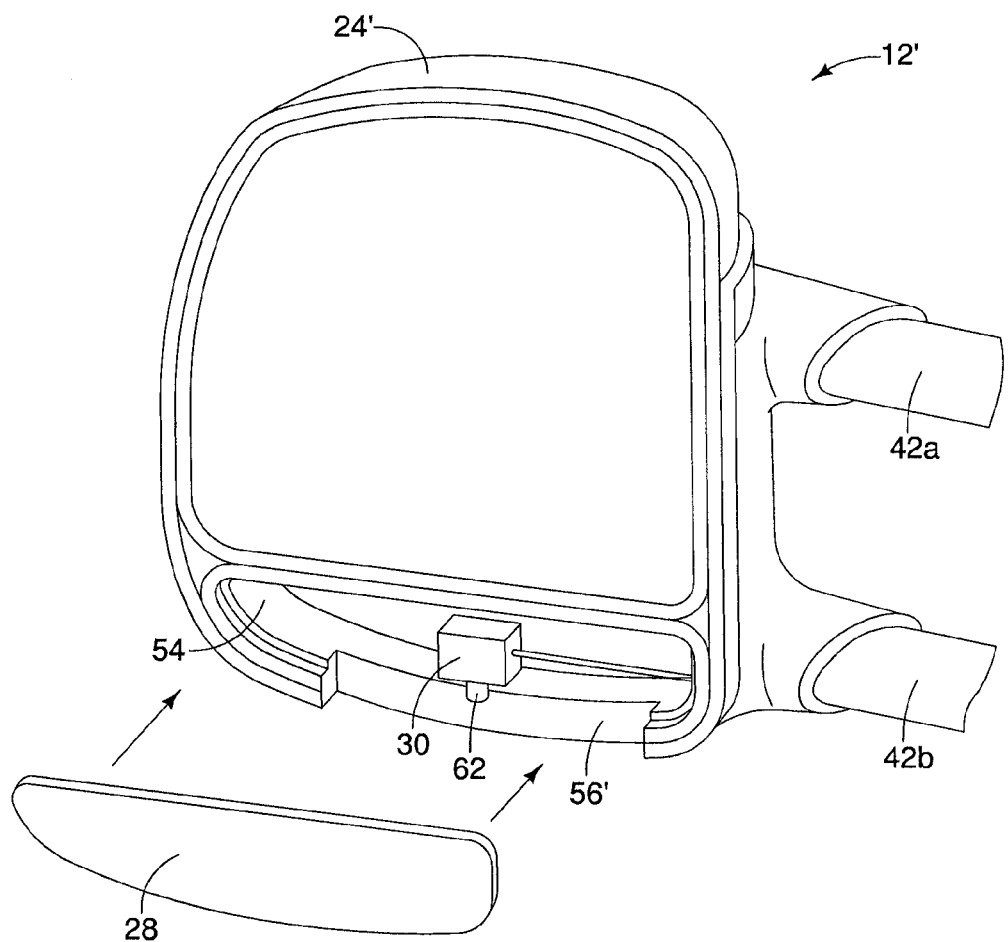
FIG. 10 is an exploded perspective view of a portion of a mirror assembly showing a mirror housing, a mirror of the mirror assembly removed from the mirror housing revealing a camera receiving recess, a camera and a portion of a tether, with a window defined by a portion of the mirror and a recess in the mirror housing in accordance with a second embodiment.
Figure 11:
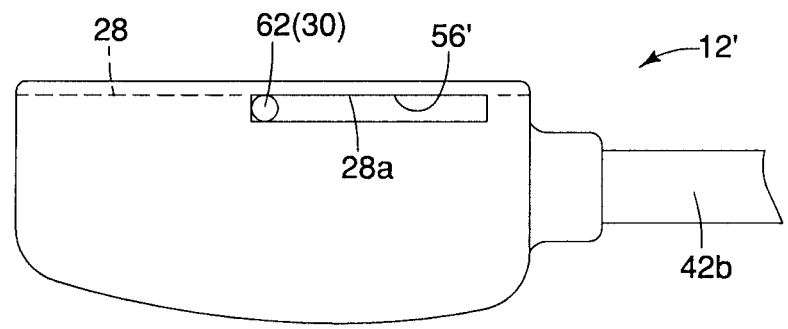
FIG. 11 is a bottom view of a portion of the mirror assembly depicted in FIG. 10 showing the mirror housing, the window with the lens extending at least partially into the window and the camera in the first position in accordance with the second embodiment.
Figure 12:
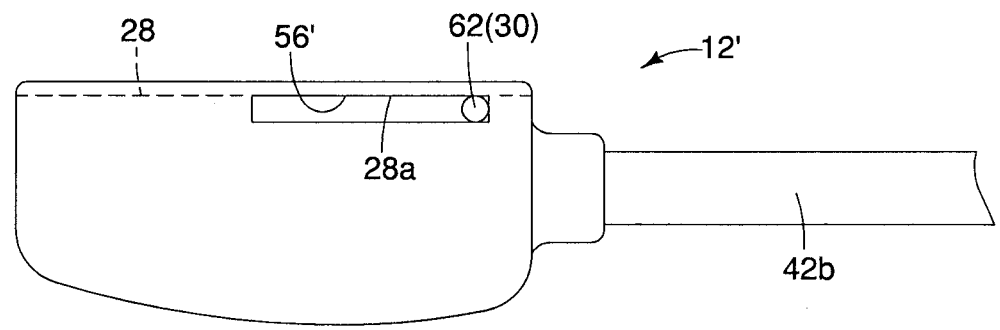
FIG. 12 is another bottom view of the portion of the mirror assembly depicted in FIG. 10, showing the mirror housing, the window with the lens extending at least partially into the window and the camera in the second position in accordance with the second embodiment.

Referring now to FIGS. 10, 11 and 12, a mirror assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The mirror assembly 12' includes a mirror housing 24' that replaces the mirror housing 24 of the first embodiment. All of the features of the mirror assembly 12 of the first embodiment are identical in the second embodiment, except the mirror housing 24' has been modified slightly. Specifically, the mirror housing 24' has been modified such that the window 56 has been replaced with a window 56', as shown in FIG. 10. Otherwise, all of the features of the mirror housing 24' are identical to the mirror housing 24.

The window 56' serves the same purpose as the window 56 of the first embodiment. However, only one side of the window 56' is defined by the mirror assembly 12'. Instead an inner face 28a of the convex mirror 28 serves to define the window 56', as indicated in FIGS. 11 and 12.

Third Embodiment

Referring now to FIGS. 13-18, a mirror assembly 12" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the mirror housing 24 has been replaced with a mirror housing 24" and a sub-mirror housing 80. Further, the telescoping portion 22 has been modified such that the tube sections 40b and 42b have been replaced with a fixed tube member 82. As will be understood from the drawings and the description herein, the tether 64 is eliminated in the third embodiment.

In the third embodiment, the mirror housing 24" has been modified when compared to the mirror housing 24, such that a camera receiving recess 54" therein is enlarged and has an opening 86 at one end thereof. The sub-mirror housing 80 fits into the opening 86, such that the sub-mirror housing 80 is matingly received in the camera receiving recess 54" to define an integrated appearance while the mirror housing 24" is in the retracted position. Further, a window 56" is formed in the sub-mirror housing 80, not the mirror housing 24".

Figure 13:
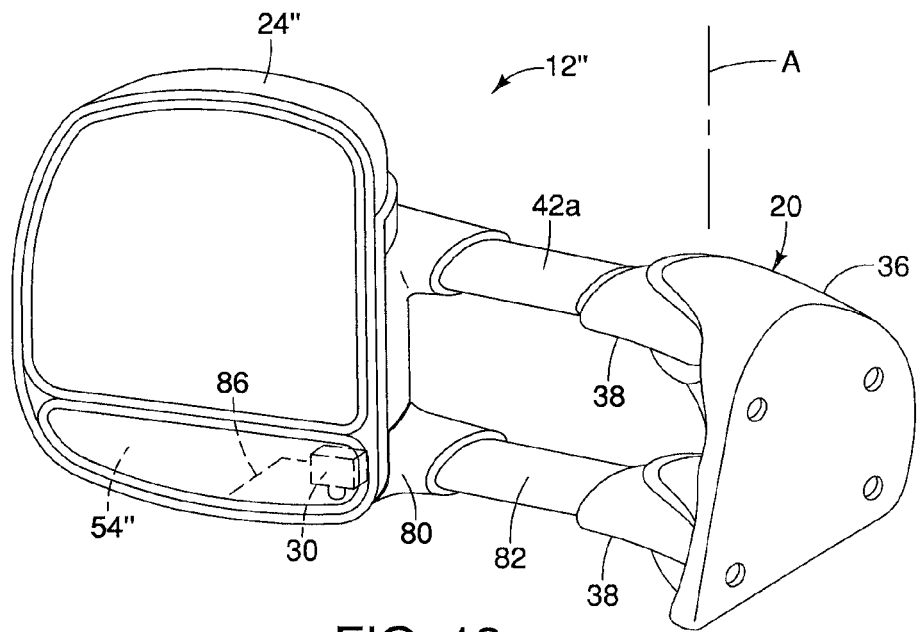
FIG. 13 is a perspective view of a mirror assembly having an attachment member, a telescoping portion, a mirror housing and a sub-mirror housing, the mirror housing defining a camera receiving recess with the mirror housing being shown in a retracted position relative to the attachment member such that the sub-mirror housing is matingly disposed within the camera receiving recess with a camera in a first position in accordance with a third embodiment.
Figure 14:
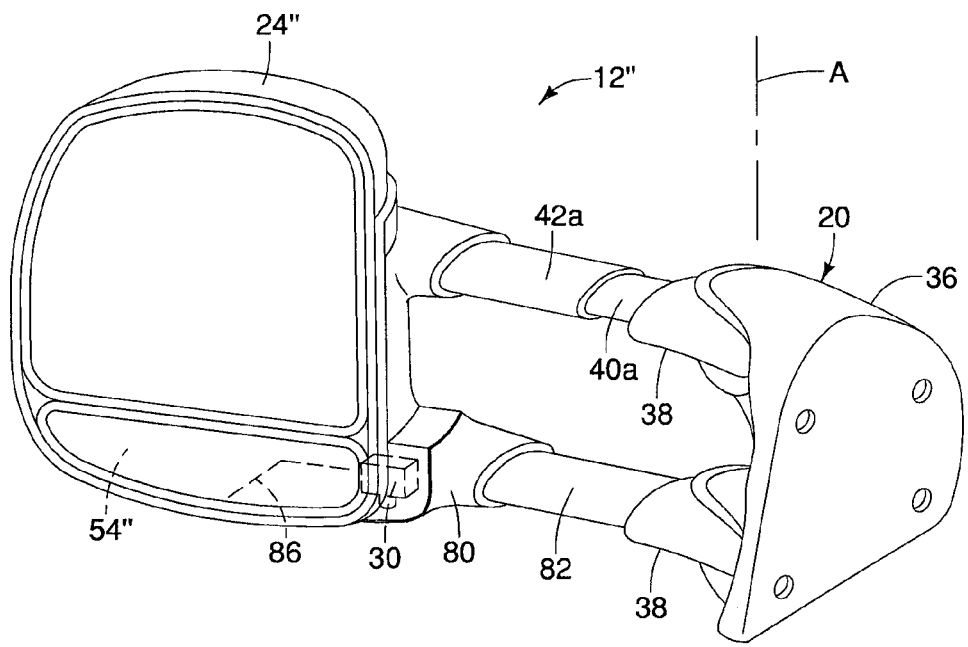
FIG. 14 is another perspective view of the mirror assembly, the mirror housing shown in an extended position relative to the attachment member with the sub-mirror housing extending at least partially out of the camera receiving recess, and showing the camera in a second position relative to the camera receiving recess, the camera being fixed in position relative to the attachment member in accordance with the third embodiment.
Figure 15:
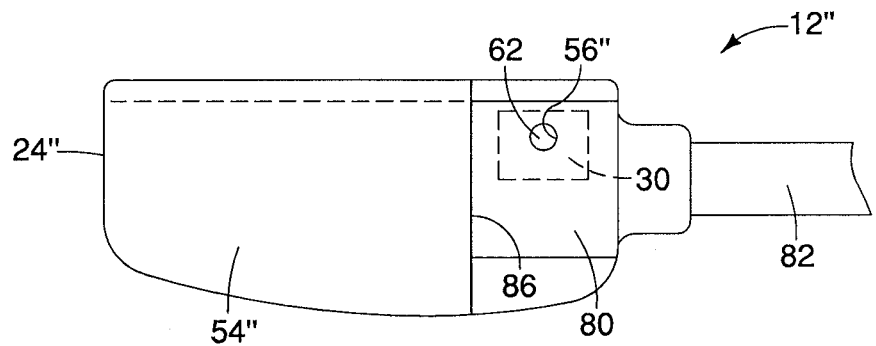
FIG. 15 is a bottom view of a portion of the mirror assembly depicted in FIG. 13 showing the sub-mirror housing matingly disposed within the camera receiving recess of the mirror housing, and the camera in the first position in accordance with the third embodiment.

In other words, the mirror housing 24" and the sub-mirror housing 80 are shaped such that with the mirror housing 24" in the retracted position, as shown in FIGS. 13 and 15, the mirror housing 24" and the sub-mirror housing 80 have an integrated appearance with the mirror housing 24" and the sub-mirror housing 80 being shaped and contoured such that in the retracted position they appear to be one seamless body or element. However, when the mirror housing 24" is moved to the extended position, as shown in FIGS. 14 and 16, the sub-mirror housing 80 remains in a fixed position relative to the vehicle attachment member 20, and therefore appears to extend inward away from the mirror housing 24".

The mirror housing 24" is supported by the tube sections 40a and 40b for telescoping movement relative to the vehicle attachment member 20. However, the fixed tube member 82 is not configured for telescopic movement. The sub-mirror housing 80 is fixedly attached to the tube member 82. The camera 30 is installed within the sub-mirror housing 80 with the lens portion 62 of the camera 30 aimed through the window 56". Therefore, the camera 30 remains in a fixed position relative to the vehicle attachment member 20, with the mirror housing 24" in the extended position.

Figure 16:
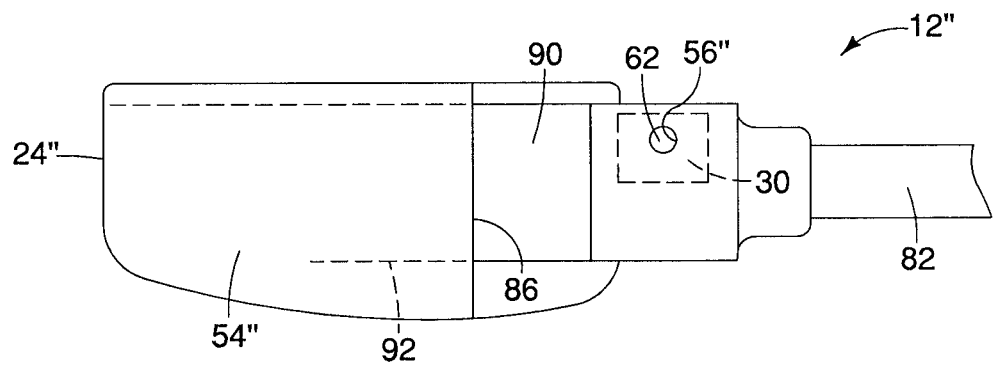
FIG. 16 is another bottom view of the portion of the mirror assembly depicted in FIG. 13, showing the mirror housing, the window with the lens extending at least partially into the window and the camera in the second position in accordance with the third embodiment.
Figure 17:
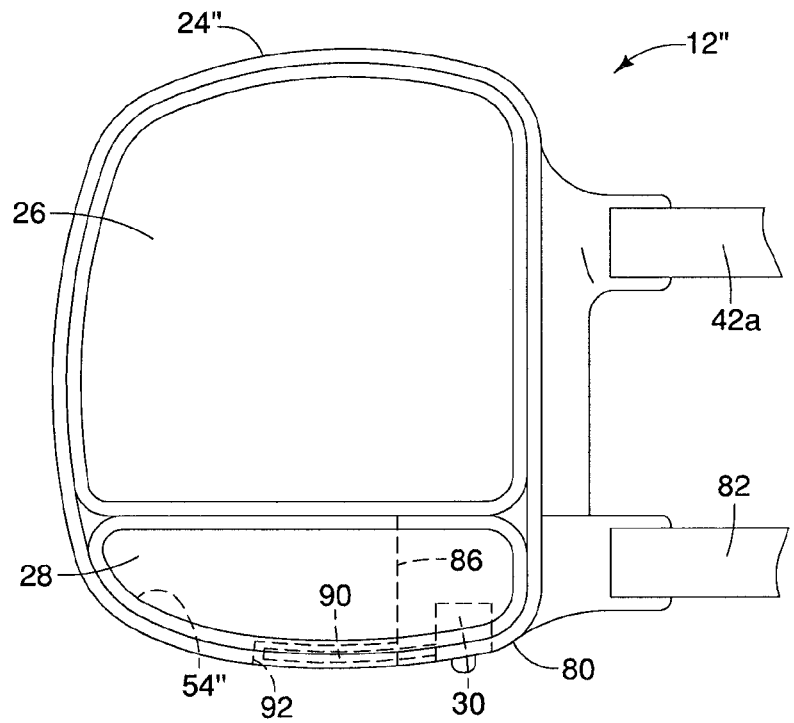
FIG. 17 is a rear view of a mirror assembly having a mirror housing and a sub-mirror housing similar to that shown in FIGS. 13-16, the mirror housing defining a camera receiving recess with the mirror housing being shown in a retracted position relative to the attachment member such that the sub-mirror housing is matingly disposed within the camera receiving recess with a camera in a first position, the sub-mirror housing including a sealing member that extends into the camera receiving recess in accordance with the third embodiment.
Figure 18:
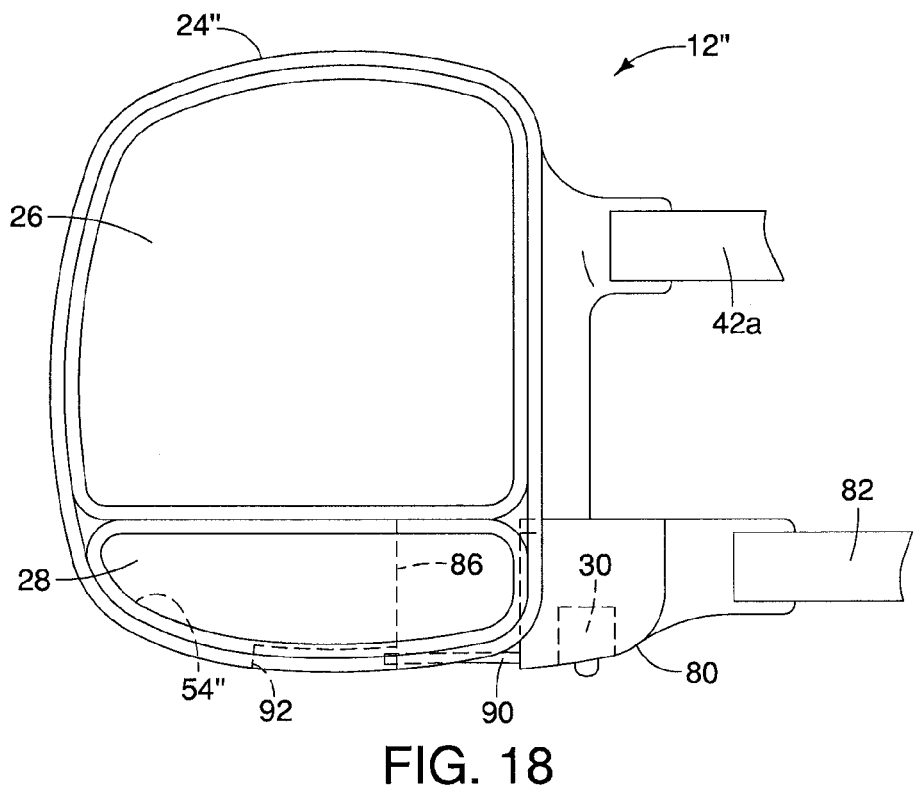
FIG. 18 is another rear view of the mirror assembly, the mirror housing shown in an extended position with the sub-mirror housing extending at least partially out of the camera receiving recess and with the sealing member covering an opening defined between the sub-mirror housing and the mirror housing in accordance with the third embodiment.
Figure 19:
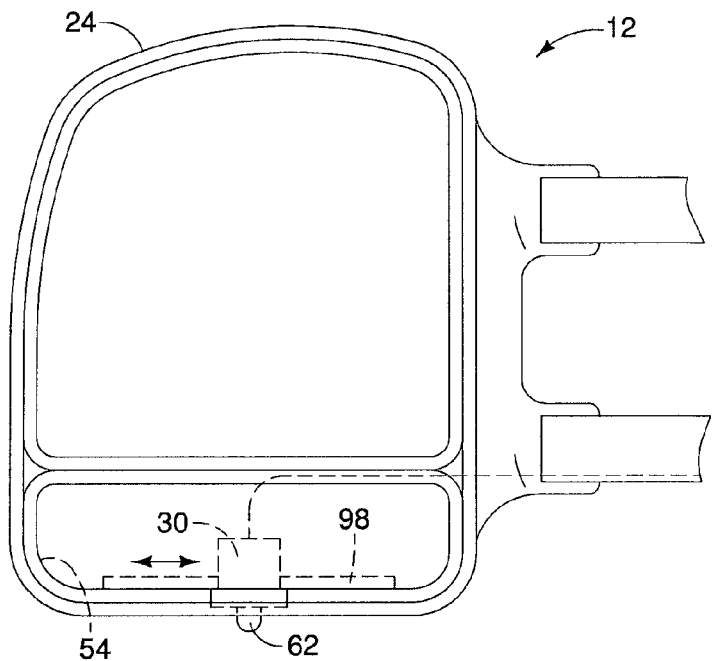
FIG. 19 is a rear view of a mirror housing shown in a retracted position relative to an attachment member (not shown) and showing a camera in a first position relative to the camera receiving recess, with sealing members on either side of camera covering portions of a window defined by the mirror housing in accordance with a fourth embodiment.
Figure 20:
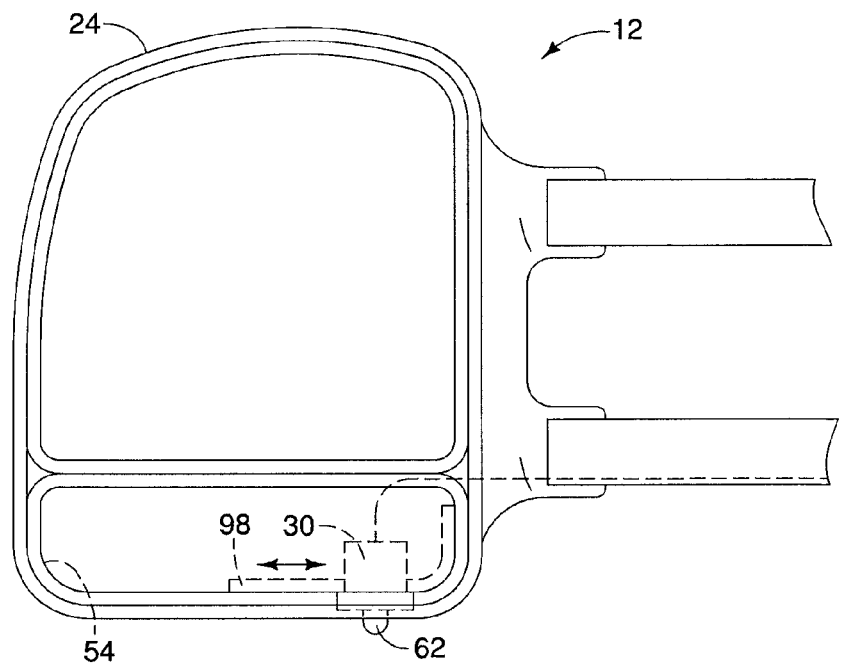
FIG. 20 is another rear view of the mirror housing depicted in FIG. 19, the mirror housing being shown in an extended position relative to the attachment member (not shown) and showing the camera in a second position relative to the camera receiving recess, the sealing members covering portions of the window in accordance with the fourth embodiment.

As shown in FIGS. 17 and 18, the sub-mirror housing 80 includes an extension 90 that is concealed within the mirror housing 24" while the mirror housing is in the retracted position as shown in FIG. 15. However, the extension 90 is exposed with the mirror housing 24" in the extended position, as indicated in FIGS. 16 and 18. Further, with the mirror housing 24" in the extended position, the extension 90 covers a portion of the opening 86 in the camera receiving recess 54" while the mirror housing 24" is in the extended position.

As indicated in FIGS. 16 and 18, the camera receiving recess 54 of the mirror housing 24" can include a recess 92 (or pocket) to receive the extension 90. Consequently, the extension 90 of the sub-mirror housing 80 is slidably received within the recess 92 formed within the mirror housing 24" when the mirror housing 24" is moved to the retracted position.

Fourth Embodiment

Referring now to FIGS. 19-22, the mirror assembly 12 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Figure 21:
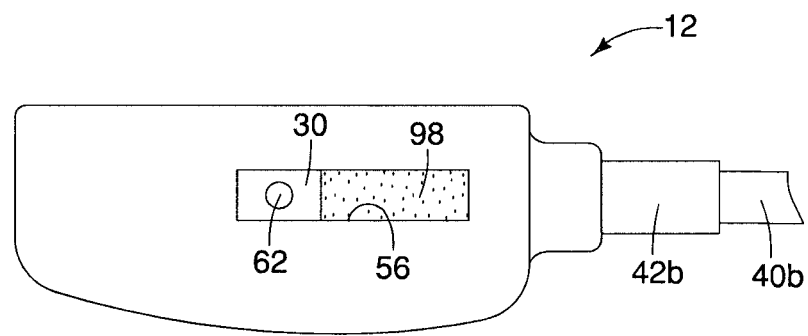
FIG. 21 is a bottom view of the mirror housing, the mirror housing shown in a retracted position relative to the attachment member (not shown) and showing the camera in the first position relative to the camera receiving recess, the sealing members covering portions of the window in accordance with the fourth embodiment.
Figure 22:
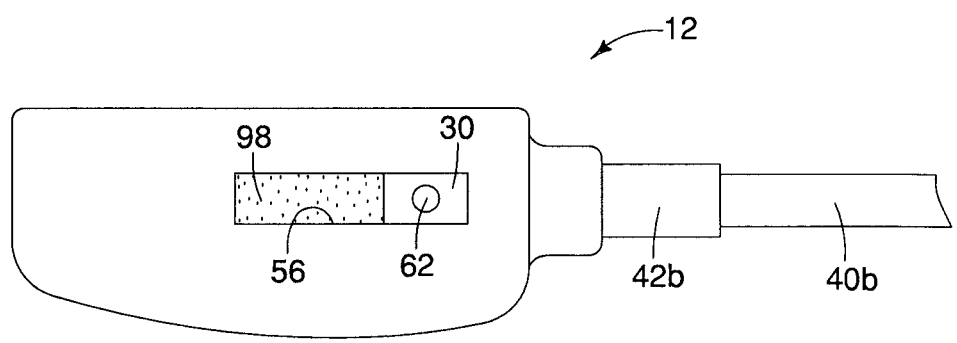
FIG. 22 is another bottom view of the mirror housing, the mirror housing shown in an extended position relative to the attachment member (not shown) and showing the camera in the second position relative to the camera receiving recess, the sealing members covering portions of the window in accordance with the fourth embodiment.

The mirror assembly 12 is identical to the mirror assembly 12, except that the camera 30 includes a cover member 98. As mentioned above, the window 56 is an elongated slot defined in a wall of the mirror housing 24. The window 56 has an overall length greater that the lens portion 62 of the camera 30. The cover member 98 is attached to the camera 30 and remains stationary with the camera 30 within the camera receiving recess 54 when the mirror housing 24 moves between the extended position and the retracted position. The dimensions of the cover member 98 are such that cover member covers and seals sections of the window 56 on either side of the lens portion 62 of the camera 30 while the mirror housing 24 is in both the extended position and the retracted position, as is indicated in FIGS. 21 and 22. Similarly to the third embodiment described above, the camera receiving recess 54 of the mirror housing 24 can include one or more recesses within which the cover member 98 is received when the mirror housing 24 moves between the extended and retracted positions.

The various elements of the vehicle 10 that have not been described are conventional components that are well known in the art. Since these elements and features are well known in the art, these structures will not be discussed or illustrated in detail herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle mirror assembly. Accordingly, these terms, as utilized to describe the present invention should be interpreted relative to a vehicle equipped with the vehicle mirror assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A vehicle mirror assembly comprising:
    a vehicle attachment member configured for attachment to a vehicle;
    a mirror housing telescopically coupled to the vehicle attachment member between a retracted position and an extended position relative to the vehicle attachment member, the mirror housing defining a camera receiving recess;
    a mirror coupled to the mirror housing; and
    a camera coupled to the vehicle attachment member and disposed in the camera receiving recess of the mirror housing at a fixed position relative to the vehicle attachment member while the mirror housing is moved between the extended position and the retracted position.

2. The vehicle mirror assembly according to claim 1, wherein
    the mirror at least partially covers the camera receiving recess while the mirror housing is in both the extended position and the retracted position.

3. The vehicle mirror assembly according to claim 1, wherein
    the mirror housing defines a window, and the camera includes a lens arranged to capture an image through the window of the mirror housing while the mirror housing is in both the extended position and the retracted position.

4. The vehicle mirror assembly according to claim 3, wherein the camera includes a portion that extends into the window while the mirror housing is in both the extended position and the retracted position.

5. The vehicle mirror assembly according to claim 3, wherein
the mirror housing includes a lower wall defining the window.

6. The vehicle mirror assembly according to claim 5, wherein
the lower wall of the mirror housing includes an edge that faces an inner face of the mirror to at least partially define the window between the edge and the inner face of the mirror.

7. The vehicle mirror assembly according to claim 5, wherein
the lower wall of the mirror housing includes front and rear edges, and the window is an elongated slot that is located between the front and rear edges.

8. The vehicle mirror assembly according to claim 3, wherein
the window is an elongated slot defined through a wall of the mirror housing having an overall length greater than the lens of the camera, the camera including a cover member covering sections of the window adjacent to the lens of the camera while the mirror housing is in both the extended position and the retracted position.

9. The vehicle mirror assembly according to claim 1, wherein
the camera includes a sub-mirror housing coupled to the vehicle attachment member in a fixed position relative thereto, the sub-mirror housing being matingly received in the camera receiving recess to define an integrated appearance while the mirror housing is in the retracted position.

10. The vehicle mirror assembly according to claim 9, wherein
the sub-mirror housing includes a contoured surface that conforms to an overall shape of the mirror housing while the mirror housing is in the retracted position.

11. The vehicle mirror assembly according to claim 9, wherein
the sub-mirror housing includes an extension that is concealed within the mirror housing while the mirror housing is in the retracted position, with the extension being exposed and covering a portion of the camera receiving recess while the mirror housing is in the extended position.

12. The vehicle mirror assembly according to claim 11, wherein
the extension of the sub-mirror housing is slidably received within a recess formed within the mirror housing.

13. The vehicle mirror assembly according to claim 1, wherein
the vehicle attachment member includes at least one hollow extension configured for attachment to the mirror housing for telescopic movement with respect thereto, and
the camera includes an elongated connecting member extending through the hollow extension, the connecting member having a first end fixedly coupled to the vehicle attachment member and a second end fixedly coupled to the camera.

14. The vehicle mirror assembly according to claim 13, wherein
the mirror housing includes a telescoping portion that is slidably disposed on the hollow extension of the vehicle attachment member for telescopic movement with respect thereto.

15. The vehicle mirror assembly according to claim 14, wherein
the elongated connecting member of the camera extends through a hollow interior of the telescoping portion of the mirror housing.

16. The vehicle mirror assembly according to claim 13, wherein
the mirror housing defines a window, and the camera includes a lens arranged to capture an image through the window of the mirror housing while the mirror housing is in both the extended position and the retracted position.

17. The vehicle mirror assembly according to claim 16, wherein
the window is an elongated slot that extends in a direction that is parallel to a lengthwise direction of the hollow extension of the vehicle attachment member.

18. The vehicle mirror assembly according to claim 16, wherein
the window is an elongated slot that extends in a direction that is parallel to a lengthwise direction of the elongated connecting member of the camera.

19. The vehicle mirror assembly according to claim 16, further comprising
the window is an elongated slot defined through a wall of the mirror housing having an overall length greater than the lens of the camera, the camera including a cover member covering sections of the window adjacent to the lens of the camera while the mirror housing is in both the extended position and the retracted position.

20. The vehicle mirror assembly according to claim 16, further comprising
the cover member is made of a flexible material slidably received within a recess formed within the mirror housing.

* * * * *